United States Patent
Lewis et al.

(10) Patent No.: US 9,856,167 B2
(45) Date of Patent: Jan. 2, 2018

(54) MITIGATION OF CONTAMINATION EFFECTS IN SET-DELAYED CEMENT COMPOSITIONS COMPRISING PUMICE AND HYDRATED LIME

(71) Applicant: Halliburton Energy Services, Inc., Houston, TX (US)

(72) Inventors: Samuel J. Lewis, Spring, TX (US); Kyriacos Agapiou, Houston, TX (US); Peter James Boul, Houston, TX (US); Pauline Akinyi Otieno, Spring, TX (US); Thomas Jason Pisklak, Cypress, TX (US); Lance Everett Brothers, Chickasha, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 77 days.

(21) Appl. No.: 14/048,486

(22) Filed: Oct. 8, 2013

(65) Prior Publication Data
US 2014/0034314 A1   Feb. 6, 2014

Related U.S. Application Data

(63) Continuation-in-part of application No. 13/417,001, filed on Mar. 9, 2012, now Pat. No. 8,851,173.
(Continued)

(51) Int. Cl.
C04B 2/02   (2006.01)
C04B 7/34   (2006.01)
(Continued)

(52) U.S. Cl.
CPC .............. *C04B 7/34* (2013.01); *C04B 28/18* (2013.01); *C04B 40/0658* (2013.01); *C09K 8/467* (2013.01); *E21B 33/138* (2013.01)

(58) Field of Classification Search
CPC .............. C04B 2/02; C04B 7/34; C09K 8/588
(Continued)

(56) References Cited

U.S. PATENT DOCUMENTS

| 2,411,793 A | 11/1946 | Kennedy |
| 2,848,051 A | 8/1958 | Williams |

(Continued)

FOREIGN PATENT DOCUMENTS

| WO | 2011-161411 | 12/2011 |
| WO | 2015034477 | 3/2015 |

OTHER PUBLICATIONS

Benge et al., "Deep Gas-Well Cementation: A Review of Risks and Design Basis for Use of a Liquid Cement Premix for Large Offshore Cementing Operations", IADC/SPE 98970, pp. 1-5, IADC/SPE Drilling Conference, 2006.
(Continued)

*Primary Examiner* — Zakiya W Bates
*Assistant Examiner* — Ashish Varma
(74) *Attorney, Agent, or Firm* — Craig W. Roddy; Tumey L.L.P.

(57) ABSTRACT

Methods and compositions for cementing are disclosed. Embodiments include a method of cementing comprising: providing a set-delayed cement composition comprising water, pumice, hydrated lime, a primary set retarder, a secondary set retarder; activating the set-delayed cement composition to produce an activated cement composition; introducing the activated cement composition into a subterranean formation; and allowing the activated cement composition to set in the subterranean formation.

26 Claims, 2 Drawing Sheets

Related U.S. Application Data

(60) Provisional application No. 61/875,404, filed on Sep. 9, 2013.

(51) Int. Cl.
  *E21B 33/138* (2006.01)
  *C04B 28/18* (2006.01)
  *C04B 40/06* (2006.01)
  *C09K 8/467* (2006.01)

(58) Field of Classification Search
  USPC .......................................................... 166/292
  See application file for complete search history.

(56) References Cited

U.S. PATENT DOCUMENTS

| | | |
|---|---|---|
| 3,238,279 A | 3/1966 | Tarlton |
| 3,557,876 A | 1/1971 | Tragesser |
| 3,887,009 A | 6/1975 | Miller et al. |
| 3,959,003 A | 5/1976 | Ostroot et al. |
| 4,054,462 A | 10/1977 | Stude |
| 4,349,443 A | 9/1982 | Block |
| 4,350,533 A | 9/1982 | Galer et al. |
| 4,462,837 A | 7/1984 | Baker |
| 4,515,216 A | 5/1985 | Childs et al. |
| 4,519,452 A | 5/1985 | Tsao et al. |
| 4,524,828 A | 6/1985 | Sabins et al. |
| 4,676,832 A | 6/1987 | Childs et al. |
| 4,818,288 A | 4/1989 | Aignesberger et al. |
| 4,875,937 A | 10/1989 | Viles |
| 5,058,679 A | 10/1991 | Hale et al. |
| 5,263,542 A | 11/1993 | Brothers |
| 5,314,022 A | 5/1994 | Cowan et al. |
| 5,447,197 A | 9/1995 | Rae et al. |
| 5,501,277 A | 3/1996 | Onan |
| 5,503,671 A | 4/1996 | Casabonne et al. |
| 5,547,506 A | 8/1996 | Rae et al. |
| 6,173,778 B1 | 1/2001 | Rae et al. |
| 6,221,148 B1 | 4/2001 | Mathur |
| 6,333,005 B1 | 12/2001 | Nguyen et al. |
| 6,457,523 B1 | 10/2002 | Vijn et al. |
| 6,488,762 B1 | 12/2002 | Shi |
| 6,610,140 B2 | 8/2003 | Vijn et al. |
| 6,907,928 B2 | 6/2005 | Di Lullo Arias et al. |
| 6,908,508 B2 | 6/2005 | Brothers |
| 7,086,466 B2 | 8/2006 | Roddy et al. |
| 7,199,086 B1 | 4/2007 | Roddy et al. |
| 7,201,798 B2 | 4/2007 | Brothers et al. |
| 7,244,303 B2 | 7/2007 | Chatterji et al. |
| 7,338,923 B2 | 3/2008 | Roddy et al. |
| 7,445,669 B2 | 11/2008 | Roddy et al. |
| 7,478,675 B2 | 1/2009 | Roddy et al. |
| 7,559,369 B2 | 7/2009 | Roddy et al. |
| 7,572,329 B2 | 8/2009 | Liu et al. |
| 7,575,055 B2 | 8/2009 | Reddy et al. |
| 7,617,870 B1 | 11/2009 | Roddy et al. |
| 7,670,427 B2 | 3/2010 | Perez-Pena |
| 7,674,332 B2 | 3/2010 | Roddy et al. |
| 7,743,828 B2 | 6/2010 | Roddy et al. |
| 7,784,542 B2 | 8/2010 | Roddy et al. |
| 7,789,150 B2 | 9/2010 | Roddy et al. |
| 7,806,183 B2 | 10/2010 | Roddy et al. |
| 7,836,954 B2 | 11/2010 | Morgan et al. |
| 7,855,170 B2 | 12/2010 | Perera et al. |
| 7,863,224 B2* | 1/2011 | Keys ....................... C04B 28/34 106/287.27 |
| 7,867,954 B2 | 1/2011 | Warrender et al. |
| 7,892,352 B2 | 2/2011 | Roddy et al. |
| 7,964,538 B2 | 6/2011 | Perera et al. |
| 8,038,790 B1 | 10/2011 | Dubey et al. |
| 8,048,219 B2 | 11/2011 | Woolfsmith |
| 8,183,186 B2 | 5/2012 | Luo |
| 8,281,859 B2 | 10/2012 | Roddy et al. |
| 8,297,357 B2 | 10/2012 | Brenneis et al. |
| 8,307,899 B2 | 11/2012 | Brenneis et al. |
| 8,403,045 B2 | 3/2013 | Brenneis et al. |
| 8,476,203 B2 | 7/2013 | Patil |
| 8,486,869 B2 | 7/2013 | Brenneis et al. |
| 8,851,173 B2 | 10/2014 | Brothers et al. |
| 9,212,534 B2 | 12/2015 | Ballew |
| 9,227,872 B2 | 1/2016 | Boul |
| 9,255,031 B2 | 2/2016 | Pisklak |
| 9,255,454 B2 | 2/2016 | Lewis |
| 9,260,343 B2 | 2/2016 | Brothers |
| 9,328,281 B2 | 5/2016 | Agapiou |
| 9,328,583 B2 | 5/2016 | Pisklak |
| 9,534,165 B2 | 1/2017 | Agapiou |
| 2002/0050232 A1 | 5/2002 | Yamashita |
| 2002/0162657 A1 | 11/2002 | Tumlin et al. |
| 2003/0121456 A1 | 7/2003 | Griffith et al. |
| 2003/0188669 A1 | 10/2003 | Sobolev et al. |
| 2003/0221778 A1 | 12/2003 | Musch et al. |
| 2004/0112600 A1 | 6/2004 | Luke et al. |
| 2004/0127606 A1 | 7/2004 | Goodwin |
| 2004/0211342 A1 | 10/2004 | Sprouts et al. |
| 2004/0226484 A1 | 11/2004 | Chatterji et al. |
| 2005/0079016 A1 | 4/2005 | Greenwood et al. |
| 2006/0025312 A1 | 2/2006 | Santra |
| 2006/0041060 A1 | 2/2006 | George |
| 2006/0054320 A1 | 3/2006 | Brothers et al. |
| 2006/0166834 A1 | 7/2006 | Roddy et al. |
| 2006/0249054 A1 | 11/2006 | Brothers et al. |
| 2006/0249289 A1 | 11/2006 | Brothers et al. |
| 2007/0051280 A1 | 3/2007 | Fyten |
| 2007/0089643 A1 | 4/2007 | Roddy et al. |
| 2007/0125534 A1 | 6/2007 | Reddy |
| 2007/0235192 A1 | 10/2007 | Michaux et al. |
| 2007/0289744 A1 | 12/2007 | Bringamon et al. |
| 2008/0066652 A1 | 3/2008 | Fraser et al. |
| 2008/0169100 A1 | 7/2008 | Lewis et al. |
| 2009/0011207 A1 | 1/2009 | Dubey |
| 2009/0020044 A1 | 1/2009 | Constantz |
| 2009/0038800 A1 | 2/2009 | Ravi |
| 2009/0105099 A1 | 4/2009 | Warrender et al. |
| 2009/0124522 A1 | 5/2009 | Roddy |
| 2010/0016183 A1 | 1/2010 | Roddy et al. |
| 2010/0025039 A1 | 2/2010 | Roddy et al. |
| 2010/0041792 A1 | 2/2010 | Roddy et al. |
| 2010/0044043 A1 | 2/2010 | Roddy |
| 2010/0193982 A1 | 8/2010 | Genolet |
| 2010/0258312 A1* | 10/2010 | Brenneis ............... C04B 28/021 166/293 |
| 2010/0270016 A1 | 10/2010 | Carelli et al. |
| 2010/0273912 A1 | 10/2010 | Roddy et al. |
| 2010/0282466 A1 | 11/2010 | Brenneis |
| 2010/0292365 A1 | 11/2010 | Roddy |
| 2010/0313795 A1 | 12/2010 | Guynn et al. |
| 2011/0017452 A1 | 1/2011 | Benkley et al. |
| 2011/0132605 A1 | 6/2011 | Sarap et al. |
| 2011/0162845 A1* | 7/2011 | Ravi ....................... C04B 28/02 166/293 |
| 2011/0305830 A1 | 12/2011 | Frantz |
| 2012/0018155 A1 | 1/2012 | Patil |
| 2012/0325478 A1 | 2/2012 | Muthusamy |
| 2012/0167803 A1 | 7/2012 | Luo |
| 2012/0186494 A1 | 7/2012 | Roddy |
| 2012/0190769 A1 | 7/2012 | Patil |
| 2012/0192768 A1 | 8/2012 | Ravi |
| 2012/0211227 A1 | 8/2012 | Thaemlitz |
| 2012/0214901 A1 | 8/2012 | Bury |
| 2012/0249552 A1 | 10/2012 | Harvill et al. |
| 2012/0251079 A1 | 10/2012 | Meschter et al. |
| 2012/0252304 A1 | 10/2012 | Vaughn |
| 2012/0291674 A1 | 11/2012 | Brenneis et al. |
| 2013/0233550 A1 | 9/2013 | Brothers |
| 2013/0248183 A1 | 9/2013 | Pisklak |
| 2014/0083701 A1 | 3/2014 | Boul et al. |
| 2014/0090843 A1 | 4/2014 | Boul et al. |
| 2014/0190696 A1 | 7/2014 | Iverson |
| 2015/0175481 A1 | 6/2015 | Pisklak |
| 2015/0175869 A1 | 6/2015 | Agapiou |

(56) References Cited

U.S. PATENT DOCUMENTS

2015/0197033 A1     7/2015   Agapiou
2015/0197453 A1     7/2015   Pisklak

OTHER PUBLICATIONS

Rae et al., "Liquid Cement Premix Introduces New Solutions to Conventional Cementing Problems", IADC/SPE 35086, pp. 393-400, IADC/SPE Drilling Conference, 1996.
Rae et al., "Liquid Cement Premix for Improved Abandonment and Workover Operations", SPE 36477, pp. 637-643, SPE, Inc., 1996.
Anderson et al., "New Technology Eliminates Bulking in Cementing Operations", SPE 36478, pp. 645-653, SPE, Inc., 1996.
Anderson et al., "New Technology Improves Cement Slurry Design", SPE 36973, pp. 127-136, SPE, Inc., 1996.
Shaefer et al., "Utilizing 'Over-Seas' Technology Improves the Cementing Processes in the DJ Basin of Colorado", SPE 80940, pp. 1-8, SPE, Inc., 2003.
"Liquid Stone® Cement Technology", Product Sales Bulletin, BJ Services Company, pp. 1-2, Oct. 19, 2004.
HES brochure "Micro Matrix® Cement Retarder", H01481, Aug. 2007.
HES brochure "CFR-3™ Cement Friction Reducer", H01325, Oct. 2005.
Hess Pumice Products, Inc., "Fact Sheet", located at website www.hesspumice.com, printed from Internet Mar. 2012.
PCT Search Report for PCT International Application No. PCT/US2013/029489 dated Apr. 19, 2013.
PCT Written Opinion for PCT International Application No. PCT/US2013/029489 dated Apr. 19, 2013.
"Conduction Calorimetric Investigation of the effect of Retarders on the Hydration of Portland Cement", V.S. Ramachandran and M.S. Lowery—Thermochimica Arts, 195 (1992) 373-387.
"Competitive Adsorption of Phosphate and Phosphonates onto Goethite", Bernd Nowack and Alan T. Stone—Water Research 40 (2006) 2201-2209.
"Molecular Modeling of the Mechanism of Action of Phosphonate Retarders on Hydrating Cements", Peter V. Coveney and William Humphries—J. Chem. Soc., Faraday Trans., 1996, 92(5, 831-841).
Yana, Y. et al., (1996). "Growth and Engineering of Microporous Zeolite Films and Coatings." MRS Proceedings, 431, p. 211.
Malvern Brochure "Zetasizer Nano ZS" dated 2011.
Nissan Chemical Brochure "Snowtex®" dated 2007.
ThermPhos Brochure "Dequest® 2006" printed from the Internet on Mar. 25, 2013.
OFI Testing Equipment, Inc. Brochure "Ultrasonic Cement Analyzer" dated 2013.
Hess Brochure "Pumice Pozz for Well Cements" dated 2013.
BASF Brochure "Oilfield Chemicals Product Range" dated Jul. 2010.
Halliburton Brochure "Micro Matrix®" dated Nov. 2006.
ThermPhos Brochure "Dequest® 2066" printed from the Internet on Nov. 18, 2013.
Benge, O.G. et al., "Evaluation of Blast Furnace Slag Slurried for Oilfield Application" SPE 27449, pp. 169-180, SPE, Inc., 1994.
Halliburton Brochure "Baroid" dated Mar. 25, 2010.
Allahverdi, A. et al., (2006). "Chemical activation and set acceleration of lime-natural pozzolan cement." Ceramics-Silikaty, 193-199.
Brito, A. et al., (2004). "High surface area support, catalyst derived from natural pumice." Study of pretreatment variables. Ind. Eng. Chem. Res., 443, 1659-1664.
Johnson, C.D. et al., (2007). "Zeolitisation of pumice—microporous materials on macroporous support structures derived from natural minerals." Mat. Chem., 17, 476-484.
Mielenz, R.C. et al., (1950). "Effect of calcination on natural pozzolans." Symposium on use of pozzolanic materials in mortars and concretes (pp. 43-92). ASTM.
Ottana, R. et al., (1982). "Hydrothermal synthesis of zeolites from pumice in alkaline and saline environment." Zeolites, 2, 295-298.
Palomo, A. et al., (2011). "Alkaline activation, procedure for transforming fly ash into new materials. Part I: Applications." World of Coal Ash (WOCA) Conference (pp. 1-14). Denver, CO:http://www.flyash.info/.
Pisklak, T.J. et al., (2004). "Preparation and characterization of mordenite thin films via pulsed laser deposition." Journal of Porous Materials, 11(4), 191-209.
Rebrov, E.V. et al., (2009). "Sol-gel synthesis of zeolite coatings and their application in catalytic microstructured reactors." Catalysis in Industry, 1(4), 322-347.
Saija, L.M. et al., (1983). "Zeolitization of pumice in ash-sodium salt solutions." Mat. Chem. Phys., 8, 207-216.
Shi, C. (2001). "An overview on the activation reactivity of natural pozzolans." Can J. Civ. Eng., 778-786.
Shvarzman, A. et al., (2001). "Influence of chemical and phase composition of mineral admixtures on their pozzolanic activity." Advances in Cement Research, 13(1), 1-7.
U.S. Appl. No. 14/067,143, filed Oct. 30, 2013.
U.S. Appl. No. 14/032,734, filed Sep. 20, 2013.
U.S. Appl. No. 14/019,730, filed Sep. 6, 2013.
U.S. Appl. No. 14/048,463, filed Oct. 8, 2013.
Official Action for U.S. Appl. No. 14/478,869 dated Feb. 26, 2015.
Official Action for U.S. Appl. No. 14/098,198 dated Nov. 20, 2014.
Official Action for U.S. Appl. No. 14/067,143 dated Mar. 12, 2015.
Search Report and Written Opinion for International Application PCT/US14/054791 dated Sep. 9, 2014.
Search Report and Written Opinion for International Application PCT/US14/054799 dated Sep. 9, 2014.
Search Report and Written Opinion for International Application PCT/US14/054497 dated Sep. 8, 2014.
Search Report and Written Opinion for International Application PCT/US14/04794 dated Sep. 9, 2014.
Search Report and Written Opinion for International Application PCT/US14/054496 dated Sep. 8, 2014.
Search Report and Written Opinion for International Application PCT/US14/054380 dated Sep. 5, 2014.
Search Report and Written Opinion for International Application PCT/US14/067112 dated Mar. 5, 2015.
Search Report and Written Opinion for International Application PCT/US14/068804 dated Mar. 17, 2015.
U.S. Office Action for U.S. Appl. No. 13/417,001 dated Apr. 16, 2014.
HES brochure Enhancer 923™ Cement Agent, H07745 Jun. 2010.
U.S. Appl. No. 14/020,625, filed Mar. 10, 2014.
U.S. Appl. No. 14/221,479, filed Mar. 21, 2014.
Ramy N.Eid, Liquid Cement: Changing the Paradigm, Society of Petroleum Engineers, Apr. 15, 2007.
U.S. Appl. No. 13/873,905, filed Apr. 30, 2013.
U.S. Appl. No. 14/143,497, filed Dec. 30, 2013.
U.S. Appl. No. 14/143,660, filed Dec. 30, 2013.
U.S. Appl. No. 14/194,125, filed Feb. 28, 2014.
U.S. Appl. No. 14/090,573, filed Nov. 26, 2013.
Notice of Allowance for U.S. Appl. No. 13/417,001 dated Mar. 9, 2012.
Search Report and Written Opinion for International Application No. PCT/US2014/032150 dated Aug. 21, 2014.
ISRWO for PCT Application No. PCT/US2015/017564 dated Jun. 6, 2015.
ISRWO for PCT Application No. PCT/US2015/019709 dated May 22, 2015.
Final Official Action for U.S. Appl. No. 14/098,198 dated Jun. 19, 2015.
Official Action for U.S. Appl. No. 14/090,573 dated Jun. 12, 2015.
Final Official Action for U.S. Appl. No. 14/478,869 dated Jun. 17, 2015.
Official Action for U.S. Appl. No. 13/854,115 dated Jul. 15, 2015.
Final Official Action for U.S. Appl. No. 14/067,143 dated Aug. 12, 2015.
Official Action for U.S. Appl. No. 14/019,730 dated Jun. 3, 2015.
Official Action for U.S. Appl. No. 14/048,463 dated Sep. 9, 2015.
Official Action for U.S. Appl. No. 14/478,813 dated Sep. 10, 2015.

(56) References Cited

OTHER PUBLICATIONS

Final Official Action for U.S. Appl. No. 14/019,730 dated Sep. 23, 2015.
International Search Report and Written Opinion for PCT/US15/21837 dated Jun. 23, 2015.
AkzoNobel Colloidal Silica, "Perspectives on Colloidal Silica," https://www.aksonobel.com/colloidalsilica/silica_Facts/perpectives, Jul. 9, 2015.
Canadian Office Action for Application No. 2,866,602 dated Nov. 30, 2015.
Final Official Action for U.S. Appl. No. 14/202,625 dated Feb. 24, 2016.
Final Official Action for U.S. Appl. No. 14/090,494 dated Feb. 1, 2016.
Final Official Action for U.S. Appl. No. 14/048,463 dated Jan. 14, 2016.
Official Action for U.S. Appl. No. 14/098,198 dated Jan. 20, 2016.
Official Action for U.S. Appl. No. 14/202,625 dated Oct. 21, 2015.
Official Action for U.S. Appl. No. 14/194,125 dated Oct. 16, 2015.
Official Action for U.S. Appl. No. 14/221,479 dated Sep. 30, 2015.
Official Action for U.S. Appl. No. 14/090,494 dated Sep. 24, 2015.
Official Action for U.S. Appl. No. 14/032,734 dated Sep. 24, 2015.
Official Action for U.S. Appl. No. 14/048,463 dated Sep. 24, 2015.
USPTO Non-Final Office Action for U.S. Appl. No. 14/478,813 dated Sep. 30, 2016.
E.B. Nelson. "Well Cementing". pp. 3-2. 1990.
Australian Patent Examination Report No. 1 for Australian Application No. 2014317858 dated Jul. 19, 2016.
"How Microsilica Improves Concrete", Publication #C850327. Copyright 1985, The Aberdeen Group.
Non-final Rejection for U.S. Appl. No. 15/087,961 dated Apr. 17, 2017.
Non-final rejection for U.S. Appl. No. 15/162,245 dated Apr. 21, 2017.

\* cited by examiner

MITIGATION OF CONTAMINATION EFFECTS IN SET-DELAYED CEMENT COMPOSITIONS COMPRISING PUMICE AND HYDRATED LIME

CROSS-REFERENCE TO RELATED APPLICATIONS

This application claims priority to U.S. Provisional Patent Application No. 61/875,404, filed on Sep. 9, 2013, titled "Mitigation of Contamination Effects in Set-Delayed Cement Compositions Comprising Pumice and Hydrated Lime" and is a continuation-in-part of U.S. patent application Ser. No. 13/417,001, titled "Set-Delayed Cement Compositions Comprising Pumice and Associated Methods," filed on Mar. 9, 2012, the entire disclosures of which are incorporated herein by reference.

BACKGROUND

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and bond the exterior surface of the pipe string to the subterranean formation. Among other things, the cement sheath surrounding the pipe string functions to prevent the migration of fluids in the annulus and to protect the pipe string from corrosion. Cement compositions also may be used in remedial cementing methods to, for example, seal cracks or holes in pipe strings or cement sheaths, seal highly permeable formation zones or fractures, place cement plugs, and the like.

A broad variety of cement compositions have been used in subterranean cementing operations. In some instances, set-delayed cement compositions have been used. Set-delayed cement compositions are characterized by their ability to remain in a pumpable fluid state for at least about one day (e.g., about 7 days, about 2 weeks, about 2 years or more) at room temperature (i.e., about 80° F.) in quiescent storage. When desired for use, the set-delayed cement compositions may be capable of activation whereby reasonable compressive strengths may be developed. For example, a cement set activator may be added to a set-delayed cement composition whereby the composition sets into a hardened mass. Among other things, the set-delayed cement composition may be suitable for use in wellbore applications, for example, where it is desired to prepare the cement composition in advance. This may allow for the cement composition to be stored prior to its use. In addition, this may allow for the cement composition to be prepared at a convenient location before being transported to the job site. Accordingly, capital and operational expenditures may be reduced due to a reduction in the need for on-site bulk storage and mixing equipment. Advantageously, this may be particularly useful for offshore cementing operations where space onboard the vessels may be limited.

While set-delayed cement compositions have been developed before, challenges exist with their successful use in subterranean cementing operations. For example, set-delayed cement compositions prepared with Portland cement may have undesired gelation issues which may limit their use and effectiveness in cementing operations. Other set-delayed compositions that have been developed, for example, those comprising hydrated lime and quartz, may have limited use at lower temperatures as they may not develop sufficient compressive strength when used in subterranean formations having lower bottom hole static temperatures.

The large-scale manufacture of set-delayed cement compositions may present additional challenges. Large batch mixers or transport trucks used during the manufacturing process of the set-delayed cement compositions may contaminate the set-delayed cement compositions with residual cementitious matter from previous manufacturing operations. The cementitious contaminants may reduce the effectiveness of the retarders or activators used with the set-delayed cement compositions. The cementitious contaminants may even render the set-delayed cement compositions unusable. Thorough cleaning of the mixers before transitioning to a new cement composition may be expensive and decrease manufacturing efficiency. Furthermore the use of cleaning agents (e.g., silica sand) may be ineffective.

BRIEF DESCRIPTION OF THE DRAWINGS

These drawings illustrate certain aspects of some of the embodiments of the present method, and should not be used to limit or define the method.

DESCRIPTION OF PREFERRED EMBODIMENTS

Figure 1:
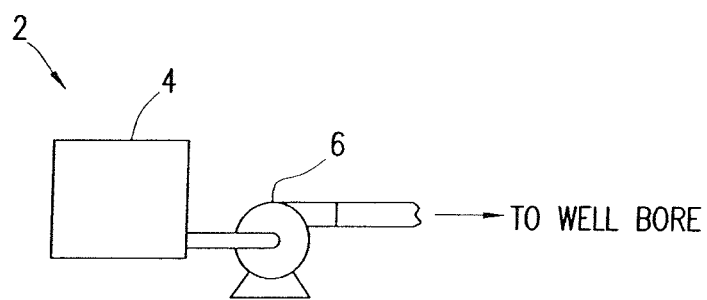
FIG. 1 illustrates a system for preparation and delivery of a set-delayed cement composition to a wellbore in accordance with certain embodiments.

The present embodiments relate to subterranean cementing operations and, more particularly, in certain embodiments, to set-delayed cement compositions and methods of using set-delayed cement compositions in subterranean formations.

Embodiments of the set-delayed cement compositions may generally comprise water, pumice, hydrated lime, and a primary set retarder. Optionally, the set-delayed cement compositions may further comprise a dispersant. Advantageously, embodiments of the set-delayed cement compositions may remain in a pumpable fluid state for an extended period of time. For example, the set-delayed cement compositions may remain in a pumpable fluid state for at least about 1 day or longer (e.g., about 2 years or longer). Advantageously, the set-delayed cement compositions may develop reasonable compressive strengths after activation at relatively low temperatures. While the set-delayed cement compositions may be suitable for a number of subterranean cementing operations, they may be particularly suitable for use in subterranean formations having relatively low bottom hole static temperatures, e.g., temperatures less than about 200° F. or ranging from about 100° F. to about 200° F. In alternative embodiments, the set-delayed cement compositions may be used in subterranean formations having bottom hole static temperatures up to 450° F. or higher.

The water used in embodiments of the set-delayed cement compositions may be from any source provided that it does not contain an excess of compounds that may undesirably affect other components in the set-delayed cement compositions. For example, a set-delayed cement composition may comprise fresh water or salt water. Salt water generally may include one or more dissolved salts therein and may be saturated or unsaturated as desired for a particular application. Seawater or brines may be suitable for use in embodiments. Further, the water may be present in an amount sufficient to form a pumpable slurry. In certain embodiments, the water may be present in the set-delayed cement compositions in an amount in the range of from about 33% to about 200% by weight of the pumice. In certain embodiments, the water may be present in the set-delayed cement compositions in an amount in the range of from about 35% to about 70% by weight of the pumice. One of ordinary skill in the art with the benefit of this disclosure will recognize the appropriate amount of water to use for a chosen application.

Embodiments of the set-delayed cement compositions may comprise pumice. Generally, pumice is a volcanic rock that can exhibit cementitious properties in that it may set and harden in the presence of hydrated lime and water. The pumice may be ground or unground. Generally, the pumice may have any particle size distribution as desired for a particular application. In certain embodiments, the pumice may have a mean particle size in a range of from about 1 micron to about 200 microns. The mean particle size corresponds to d50 values as measured by particle size analyzers such as those manufactured by Malvern Instruments, Worcestershire, United Kingdom. In specific embodiments, the pumice may have a mean particle size in a range of from about 1 micron to about 200 microns, from about 5 microns to about 100 microns, or from about 10 microns to about 50 microns. In one particular embodiment, the pumice may have a mean particle size of less than about 15 microns. An example of a suitable pumice is DS-325 lightweight aggregate, available from Hess Pumice Products, Inc., Malad, Id. DS-325 aggregate has a particle size of less than about 15 microns. It should be appreciated that particle sizes too small may have mixability problems while particle sizes too large may not be effectively suspended in the compositions. One of ordinary skill in the art, with the benefit of this disclosure, should be able to select a pumice with a particle size suitable for a chosen application.

Embodiments of the set-delayed cement compositions may comprise hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in embodiments of the set-delayed cement compositions, for example, to form a hydraulic composition with the pumice. For example, the hydrated lime may be included in a pumice-to-hydrated-lime weight ratio of about 10:1 to about 1:1 or 3:1 to about 5:1. Where present, the hydrated lime may be included in the set-delayed cement compositions in an amount in the range of from about 10% to about 100% by weight of the pumice, for example. In some embodiments, the hydrated lime may be present in an amount ranging between any of and/or including any of about 10%, about 20%, about 40%, about 60%, about 80%, or about 100% by weight of the pumice. In some embodiments, the cementitious components present in the set-delayed cement composition may consist essentially of the pumice and the hydrated lime. For example, the cementitious components may primarily comprise the pumice and the hydrated lime without any additional components (e.g., Portland cement, fly ash, slag cement) that hydraulically set in the presence of water. One of ordinary skill in the art, with the benefit of this disclosure, will recognize the appropriate amount of hydrated lime to include for a chosen application.

Embodiments of the set-delayed cement compositions may comprise a primary set retarder. A broad variety of primary set retarders may be suitable for use in the set-delayed cement compositions. For example, the primary set retarders may comprise phosphonic acids, such as ethylenediamine tetra(methylene phosphonic acid), diethylenetriamine penta(methylene phosphonic acid), etc.; phosphonic acid derivatives; lignosulfonates, such as sodium lignosulfonate, calcium lignosulfonate, etc.; salts such as stannous sulfate, lead acetate, monobasic calcium phosphate; organic acids such as citric acid, tartaric acid, etc.; cellulose derivatives such as hydroxylethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof or mixtures thereof. One example of a suitable commercial primary set retarder is Micro Matrix® cement retarder, available from Halliburton Energy Services, Inc., Houston, Tex. Generally, the primary set retarder may be present in the set-delayed cement compositions in an amount sufficient to delay setting for a desired time. In some embodiments, the primary set retarder may be present in the set-delayed cement compositions in an amount in the range of from about 0.01% to about 10% by weight of the pumice. In specific embodiments, the primary set retarder may be present in an amount ranging between any of and/or including any of about 0.01%, about 0.1%, about 1%, about 2%, about 4%, about 6%, about 8%, or about 10% by weight of the pumice. One of ordinary skill in the art, with the benefit of this disclosure, will recognize the appropriate amount of primary set retarder to include for a chosen application.

As discussed above, an issue with the manufacture of set-delayed cement compositions is the potential for cementitious contamination at the bulk plant or during transport. Cementitious contamination, as defined herein, refers to the contamination of a set-delayed cement composition with any material that is not an intended component of the set-delayed cement composition; said material being unintentionally added, directly or indirectly, to the set-delayed cement composition; wherein said material is cementitious in and of itself, becomes cementitious upon the unintended contact with the set-delayed cement composition, and/or promotes or induces early setting, gelling, or any other type of cementitious reaction in the set-delayed cement composition. Typically, cementitious contamination may be mitigated by cleaning the bulk plant machinery or the transport trucks. However, this procedure may be costly and/or ineffective. Supplementing the set-delayed cement compositions with additional cement retarders may be a low cost and more effective alternative to the typical cementitious contamination cleanup methods. Advantageously, the use of multiple retarders may provide superior mechanical properties as compared to using a higher concentration of a single retarder. For example, using a high concentration of a single retarder may cause the set-delayed cement composition slurry to thicken. This thickening effect may cause field handling and pumpability issues.

Embodiments of the set-delayed cement compositions may additionally comprise one or more secondary set retarders in addition to the primary set retarder. The secondary set retarders may be used to mitigate the effect of cementitious contaminants (e.g. residual manufacturing contaminants) on the set-delayed cement compositions. Cementitious contaminants, as defined herein, refers to any material that is not an intended component of the set-delayed cement composition; said material being unintentionally added, directly or indirectly, to the set-delayed cement composition; wherein said material is cementitious in and of itself, becomes cementitious upon the unintended contact with the set-delayed cement composition, and/or promotes or induces early setting, gelling, or any other type of cementitious reaction in the set-delayed cement composition. Without limitation, examples of cementitious contaminants include the unintended addition of hydraulic cements such as Portland cement, calcium aluminate cement, etc.; pozzolanic material such as fly ash, etc.; slag; cement kiln dust; plasters such as gypsum plasters, lime plasters, cement plaster, etc.; materials that promote or induce cementitious reactions; and any combination thereof. Cementitious contaminants may have an adverse effect on the properties of the set-delayed cement compositions. Embodiments of the set-delayed cement compositions comprising secondary set retarders may also comprise cementitious contaminants that were unintentionally added to the set-delayed cement composition.

A broad variety of secondary set retarders may be suitable for use in the set-delayed cement compositions. The secondary set retarder may be chemically different from the primary set retarder; alternatively the secondary set retarder may be chemically similar to the primary set retarder. For example, the secondary set retarders may comprise phosphonic acids, such as ethylenediamine tetra(methylene phosphonic acid), diethylenetriamine penta(methylene phosphonic acid), etc.; phosphonic acid derivatives; lignosulfonates, such as sodium lignosulfonate, calcium lignosulfonate, etc.; salts such as stannous sulfate, lead acetate, monobasic calcium phosphate; organic acids such as citric acid, tartaric acid, etc.; cellulose derivatives such as hydroxyethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof or mixtures thereof. One example of a suitable commercial secondary set retarder is Micro Matrix® cement retarder, available from Halliburton Energy Services, Inc., Houston, Tex. Generally, the secondary set retarder may be present in the set-delayed cement compositions in an amount sufficient to delay setting for a desired time. In some embodiments, the secondary set retarder may be present in the set-delayed cement compositions in an amount in the range of from about 0.01% to about 10% by weight of the pumice. In specific embodiments, the secondary set retarder may be present in an amount ranging between any of and/or including any of about 0.01%, about 0.1%, about 1%, about 2%, about 4%, about 6%, about 8%, or about 10% by weight of the pumice. One of ordinary skill in the art, with the benefit of this disclosure, will recognize the appropriate amount of secondary set retarder to include for a chosen application.

As previously mentioned, embodiments of the set-delayed cement compositions may optionally comprise a dispersant. Examples of suitable dispersants include, without limitation, sulfonated-formaldehyde-based dispersants (e.g., sulfonated acetone formaldehyde condensate), examples of which may include Daxad® 19 available from Geo Specialty Chemicals, Ambler, Pa. Other suitable dispersants may be polycarboxylated ether dispersants such as Liquiment® 5581F and Liquiment® 514L available from BASF Corporation Houston, Tex.; or Ethacryl G available from Coatex, Genay, France. An additional example of a suitable commercially available dispersant is CFR™-3 dispersant, available from Halliburton Energy Services, Inc, Houston, Tex. Of particular importance in regards to the examples that follow, is that the Liquiment® 514L dispersant comprises 36% by weight of the polycarboxylated ether in water. While a variety of dispersants may be used in accordance with embodiments, polycarboxylated ether dispersants may be particularly suitable for use in some embodiments. Without being limited by theory, it is believed that polycarboxylated ether dispersants may synergistically interact with other components of the set-delayed cement composition. For example, it is believed that the polycarboxylated ether dispersants may react with certain set retarders (e.g., phosphonic acid derivatives) resulting in formation of a gel that suspends the pumice and hydrated lime in the composition for an extended period of time.

In some embodiments, the dispersant may be included in the set-delayed cement compositions in an amount in the range of from about 0.01% to about 5% by weight of the pumice. In specific embodiments, the dispersant may be present in an amount ranging between any of and/or including any of about 0.01%, about 0.1%, about 0.5%, about 1%, about 2%, about 3%, about 4%, or about 5% by weight of the pumice. With the benefit of this disclosure, one of ordinary skill in the art will recognize the appropriate amount of dispersant to include for a chosen application.

Other additives suitable for use in subterranean cementing operations also may be included in embodiments of the set-delayed cement compositions. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the set-delayed cement composition after storing but prior to placement of the set-delayed cement composition into a subterranean formation. With the benefit of this disclosure, a person having ordinary skill in the art will be able to determine the type and amount of additive useful for a particular application and desired result.

Those of ordinary skill in the art will appreciate that embodiments of the set-delayed cement compositions generally should have a density suitable for a particular application. By way of example, the set-delayed cement compositions may have a density in the range of from about 4 pounds per gallon ("lb/gal") to about 20 lb/gal. In certain embodiments, the set-delayed cement compositions may have a density in the range of from about 8 lb/gal to about 17 lb/gal. Embodiments of the set-delayed cement compositions may be foamed or unfoamed or may comprise other means to reduce their densities, such as hollow microspheres, low-density elastic beads, or other density-reducing additives known in the art. In embodiments, the density may be reduced after storing the composition, but prior to placement in a subterranean formation. Those of ordinary skill in the art, with the benefit of this disclosure, will recognize the appropriate density for a particular application.

As previously mentioned, the set-delayed cement compositions may have a delayed set in that they remain in a pumpable fluid state for at least one day (e.g., at least about 1 day, about 2 weeks, about 2 years or more) at room temperature in quiescent storage. For example, the set-delayed cement compositions may remain in a pumpable fluid state for a period of time from about 1 day to about 7 days or more. In some embodiments, the set-delayed cement compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured using a pressurized consistometer in accordance with the procedure for determining cement thickening times set forth in API RP Practice 10B-2, *Recommended Practice for Testing Well Cements*, First Edition, July 2005.

When desired for use, embodiments of the set-delayed cement compositions may be activated (e.g., by combination with an activator) to set into a hardened mass. By way of example, embodiments of the set-delayed cement compositions may be activated to form a hardened mass in a time period in the range of from about 1 hour to about 12 hours. For example, embodiments of the set-delayed cement compositions may set to form a hardened mass in a time period ranging between any of and/or including any of about 1 day, about 2 days, about 4 days, about 6 days, about 8 days, about 10 days, or about 12 days.

In some embodiments, the set-delayed cement compositions may set to have a desirable compressive strength after activation. Compressive strength is generally the capacity of a material or structure to withstand axially directed pushing forces. The compressive strength may be measured at a specified time after the set-delayed cement composition has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, Tex. Compressive strength values may be determined in accordance with API RP 10B-2, *Recommended Practice for Testing Well Cements*, First Edition, July 2005.

By way of example, the set-delayed cement compositions may develop a 24-hour compressive strength in the range of from about 50 psi to about 5000 psi, alternatively, from about 100 psi to about 4500 psi, or alternatively from about 500 psi to about 4000 psi. In some embodiments, the set-delayed cement compositions may develop a compressive strength in 24 hours of at least about 50 psi, at least about 100 psi, at least about 500 psi, or more. In some embodiments, the compressive strength values may be determined using destructive or non-destructive methods at a temperature ranging from 100° F. to 200° F.

Embodiments may include the addition of a cement set activator to the set-delayed cement compositions. Examples of suitable cement set activators include, but are not limited to: amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. In some embodiments, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the set-delayed cement compositions, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In particular embodiments, the activator may be provided and added to the set-delayed cement composition as a liquid additive, for example, a liquid additive comprising a monovalent salt, a polyphosphate, and optionally a dispersant.

The cement set activator should be added to embodiments of the set-delayed cement compositions in amounts sufficient to induce the set-delayed cement compositions to set into a hardened mass. In certain embodiments, the cement set activator may be added to a set-delayed cement composition in an amount in the range of about 1% to about 20% by weight of the pumice. In specific embodiments, the cement set activator may be present in an amount ranging between any of and/or including any of about 1%, about 5%, about 10%, about 15%, or about 20% by weight of the pumice. One of ordinary skill in the art, with the benefit of this disclosure, will recognize the appropriate amount of cement set activator to include for a chosen application.

As will be appreciated by those of ordinary skill in the art, embodiments of the set-delayed cement compositions may be used in a variety of subterranean operations, including primary and remedial cementing. In some embodiments, a set-delayed cement composition may be provided that comprises water, pumice, hydrated lime, a set retarder, and optionally a dispersant. The set-delayed cement composition may be introduced into a subterranean formation and allowed to set therein. As used herein, introducing the set-delayed cement composition into a subterranean formation includes introduction into any portion of the subterranean formation, including, without limitation, into a wellbore drilled into the subterranean formation, into a near wellbore region surrounding the wellbore, or into both. Embodiments may further include activation of the set-delayed cement composition. The activation of the set-delayed cement composition may comprise, for example, the addition of a cement set activator to the set-delayed cement composition.

In some embodiments, a set-delayed cement composition may be provided that comprises water, pumice, hydrated lime, a set retarder, and optionally a dispersant. The set-delayed cement composition may be stored, for example, in a vessel or other suitable container. The set-delayed cement composition may be permitted to remain in storage for a desired time period. For example, the set-delayed cement composition may remain in storage for a time period of about 1 day or longer. For example, the set-delayed cement composition may remain in storage for a time period of about 1 day, about 2 days, about 5 days, about 7 days, about 10 days, about 20 days, about 30 days, about 40 days, about 50 days, about 60 days, or longer. In some embodiments, the set-delayed cement composition may remain in storage for a time period in a range of from about 1 day to about 7 days or longer. Thereafter, the set-delayed cement composition may be activated, for example, by addition of a cement set activator, introduced into a subterranean formation, and allowed to set therein.

In primary cementing embodiments, for example, embodiments of the set-delayed cement composition may be introduced into an annular space between a conduit located in a wellbore and the walls of a wellbore (and/or a larger conduit in the wellbore), wherein the wellbore penetrates the subterranean formation. The set-delayed cement composition may be allowed to set in the annular space to form an annular sheath of hardened cement. The set-delayed cement composition may form a barrier that prevents the migration of fluids in the wellbore. The set-delayed cement composition may also, for example, support the conduit in the wellbore.

In remedial cementing embodiments, a set-delayed cement composition may be used, for example, in squeeze-cementing operations or in the placement of cement plugs. By way of example, the set-delayed composition may be placed in a wellbore to plug an opening (e.g., a void or crack) in the formation, in a gravel pack, in the conduit, in the cement sheath, and/or between the cement sheath and the conduit (e.g., a microannulus).

An example embodiment comprises a method of cementing comprising: providing a set-delayed cement composition comprising water, pumice, hydrated lime, a primary set retarder, and a secondary set retarder; activating the set-delayed cement composition to produce an activated cement composition; introducing the activated cement composition into a subterranean formation; and allowing the activated cement composition to set in the subterranean formation.

An example embodiment comprises a method of mitigating contamination in the manufacture of a set-delayed cement composition, the method comprising: providing a dry-blend cement composition comprising pumice and hydrated lime; and preparing a set-delayed cement composition comprising water, the dry-blend cement composition, a primary set retarder, and a secondary set retarder.

An example embodiment comprises a set-delayed cement composition comprising: water; pumice; hydrated lime; a primary set retarder; and a secondary set retarder; wherein the set-delayed cement composition further comprises a cementitious contaminant; and wherein the set-delayed cement composition will remain in a pumpable fluid state for a time period of at least about 1 day at room temperature in quiescent storage.

An example embodiment comprises a set-delayed cement system comprising: a set-delayed cement composition comprising water, pumice, hydrated lime, a primary set retarder, and a secondary set retarder; wherein the set-delayed cement composition additionally comprises a cementitious contaminant; an activator for activating the set-delayed cement composition; mixing equipment for mixing the set-delayed cement composition and the activator to form an activated cement composition; and pumping equipment for delivering the activated cement composition into a wellbore.

Referring now to FIG. 1, preparation of a set-delayed cement composition in accordance with example embodiments will now be described. FIG. 1 illustrates a system 2 for preparation of a set-delayed cement composition and delivery to a wellbore in accordance with certain embodiments. As shown, the set-delayed cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the lime/settable material with the water as it is being pumped to the wellbore.

Figure 2A:
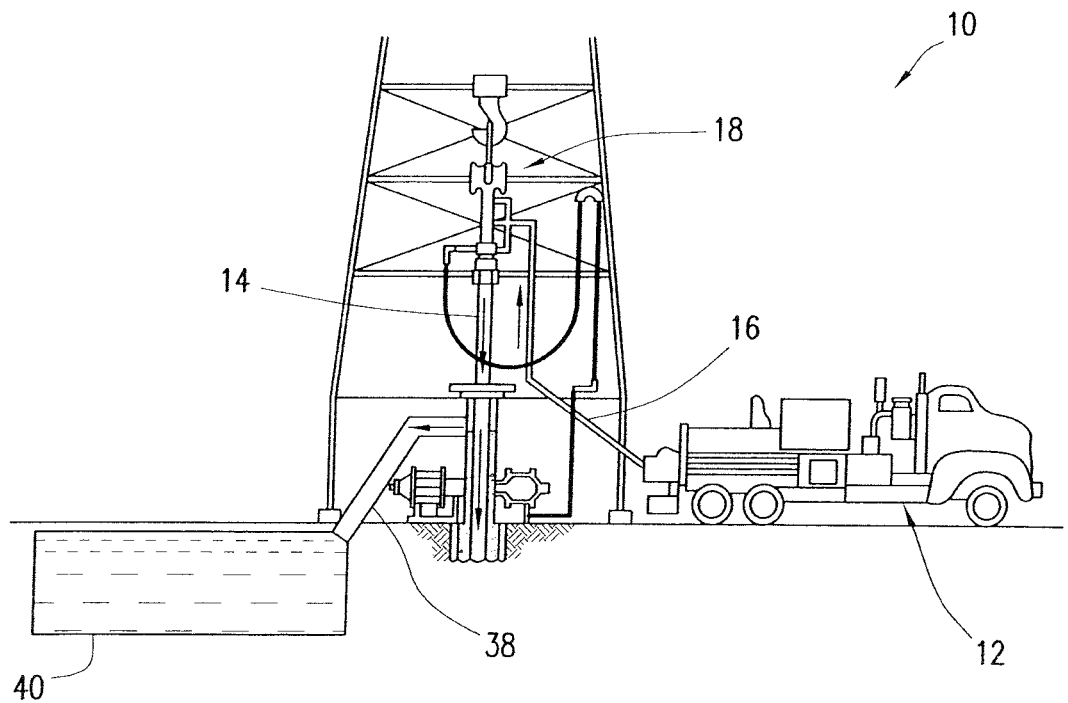
FIG. 2A illustrates surface equipment that may be used in placement of a set-delayed cement composition in a wellbore in accordance with certain embodiments.

An example technique for placing a set-delayed cement composition into a subterranean formation will now be described with reference to FIGS. 2A and 2B. FIG. 2A illustrates surface equipment 10 that may be used in placement of a set-delayed cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a set-delayed cement composition 14 through a feed pipe 16 and to a cementing head 18 which conveys the set-delayed cement composition 14 downhole.

Figure 2B:
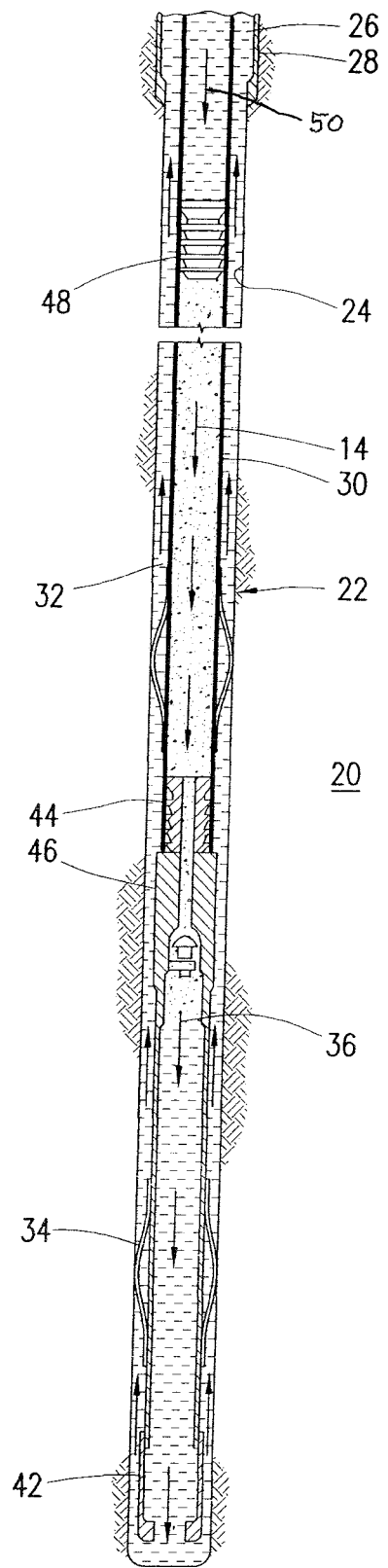
FIG. 2B illustrates placement of a set-delayed cement composition into a wellbore annulus in accordance with certain embodiments.

Turning now to FIG. 2B, the set-delayed cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the set-delayed cement compositions 14 may be pumped down the interior of the casing 30. The set-delayed cement composition 14 may be allowed to flow down the interior of the casing 30 through the casing shoe 42 at the bottom of the casing 30 and up around the casing 30 into the wellbore annulus 32. The set-delayed cement composition 14 may be allowed to set in the wellbore annulus 32, for example, to form a cement sheath that supports and positions the casing 30 in the wellbore 22. While not illustrated, other techniques may also be utilized for introduction of the set-delayed cement composition 14. By way of example, reverse circulation techniques may be used that include introducing the set-delayed cement composition 14 into the subterranean formation 20 by way of the wellbore annulus 32 instead of through the casing 30.

As it is introduced, the set-delayed cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the set-delayed cement composition 14, for example, to separate the set-delayed cement composition 14 from the fluids 36 that may be inside the casing 30 prior to cementing. After the bottom plug 44 reaches the landing collar 46, a diaphragm or other suitable device rupture to allow the set-delayed cement composition 14 through the bottom plug 44. In FIG. 2B, the bottom plug 44 is shown on the landing collar 46. In the illustrated embodiment, a top plug 48 may be introduced into the wellbore 22 behind the set-delayed cement composition 14. The top plug 48 may separate the set-delayed cement composition 14 from a displacement fluid 50 and also push the set-delayed cement composition 14 through the bottom plug 44.

The exemplary set-delayed cement compositions disclosed herein may directly or indirectly affect one or more components or pieces of equipment associated with the preparation, delivery, recapture, recycling, reuse, and/or disposal of the disclosed set-delayed cement compositions. For example, the disclosed set-delayed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary set-delayed cement compositions. The disclosed set-delayed cement compositions may also directly or indirectly affect any transport or delivery equipment used to convey the set-delayed cement compositions to a well site or downhole such as, for example, any transport vessels, conduits, pipelines, trucks, tubulars, and/or pipes used to compositionally move the set-delayed cement compositions from one location to another, any pumps, compressors, or motors (e.g., topside or downhole) used to drive the set-delayed cement compositions into motion, any valves or related joints used to regulate the pressure or flow rate of the set-delayed cement compositions, and any sensors (i.e., pressure and temperature), gauges, and/or combinations thereof, and the like. The disclosed set-delayed cement compositions may also directly or indirectly affect the various downhole equipment and tools that may come into contact with the set-delayed cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present embodiments, the following examples of certain aspects of some embodiments are given. In no way should the following examples be read to limit, or define, the entire scope of the embodiments.

Example 1

Twelve-thousand pounds of pumice and hydrated lime for use in a set-delayed cement composition were dry blended at a bulk plant facility. Samples of the dry blend cement composition were collected for use. Using the collected dry blend cement composition, six experimental set-delayed samples were prepared. The experimental samples differed only in that each contained a unique secondary set retarder. Two additional laboratory set-delayed samples were prepared using pumice and hydrated lime that were not dry blended in the trial. The two laboratory samples did not contain a secondary retarder; however, one of the laboratory samples was intentionally contaminated with Class H Portland cement. The experimental and laboratory samples additionally comprised water, weight additive (ground hausmannite ore), a primary retarder (phosphonic acid derivative), and a polycarboxylated ether dispersant. The compositional makeup of the eight samples is displayed in Table 1 below. While not indicated in Table 1, it is believed that the six experimental samples were contaminated with Portland cement or other cementitious contaminants at the bulk plant facility.

TABLE 1

Sample Compositions

| | % By weight of Pumice | Laboratory Sample 1 (g) | Laboratory Sample 2 (g) | Experimental Samples (g) |
|---|---|---|---|---|
| Pumice | 100 | 133.3 | 133.3 | 133.3 |
| Lime | 20 | 26.7 | 26.7 | 26.7 |
| Water | 65 | 80.0 | 80.0 | 80.0 |
| Weighting Additive | 2.0 | 2.7 | 2.7 | 2.7 |
| Primary Retarder | 0.06 gal/sk | 1.7 | 1.7 | 1.7 |
| Dispersant | 0.60 | 0.8 | 0.8 | 0.8 |
| Class H Portland Cement | 5.0 | — | 6.67 | — |

As discussed in the preceding paragraph, the six experimental samples each comprised a unique secondary set retarder. The secondary set retarder was present in an amount of 0.5% by weight of the pumice. All eight of the samples were placed in sealed containers and allowed to age for 24 hours before observation. The six retarders used for the experimental samples comprised zinc oxide, a copolymer of 2-acrylamido-2-methylpropane sulfonic acid and acrylic acid, a lignosulfonate retarder, tartaric acid, potassium pentaborate, and citric acid. The results of each combination are listed in Table 2 below.

TABLE 2

Sample Results

| Sample | Secondary Retarder | Observation |
|---|---|---|
| Laboratory Sample 1 | None | Still flowable |
| Laboratory Sample 2 | None | Gelled overnight |
| Experimental Sample 1 | Zinc Oxide | Gelled overnight |
| Experimental Sample 2 | Copolymer | Gelled overnight |
| Experimental Sample 3 | Lignosulfonate | Still flowable |
| Experimental Sample 4 | Tartaric Acid | Partially gelled overnight |
| Experimental Sample 5 | Potassium Pentaborate | Still flowable |
| Experimental Sample 6 | Citric Acid | Gelled immediately |

The results indicate that the set-delayed samples adversely reacted to the inclusion of Portland Class H cement. In particular, Laboratory Sample 2 that included the Portland Class H cement gelled while Laboratory Sample 1 without any added Portland cement was still flowable. As seen from the experimental samples, the addition of a secondary set retarder may be used to counteract the cementitious contaminants from the bulk plant. By way of example, the experimental samples with the lignosulfonate and the potassium pentaborate retarders did not gel overnight.

Example 2

Three liter-sized samples of set-delayed cement compositions were prepared using the same components and proportions as Example 1, however, the samples additionally comprised a secondary lignosulfonate retarder (the same retarder used in Experimental Sample 3 from Example 1) and/or were intentionally contaminated with Class H Portland cement. The compositional makeup of the three samples is displayed in Table 3 below.

TABLE 3

Sample Compositions

| | % By weight of Pumice | Sample 1 (g) | Sample 2 (g) | Sample 3 (g) |
|---|---|---|---|---|
| Pumice | 100 | 1000.0 | 1000.0 | 1000.0 |
| Lime | 20 | 200.0 | 200.0 | 200.0 |
| Water | 65 | 650.0 | 650.0 | 650.0 |
| Weighting Agent | 2.0 | 20.0 | 20.0 | 20.0 |
| Primary Retarder | 0.06 gal/sk | 12.5 | 12.5 | 12.5 |
| Dispersant | 0.60 | 6.0 | 6.0 | 6.0 |
| Class H Portland Cement | 2.5 | 0.0 | 25.0 | 25.0 |
| Secondary Retarder | 0.50 | 5.0 | 5.0 | 0.0 |

The volumetric average viscosity was plotted at 100 rpm for each sample over a 21 day span. A Model 35A Fann Viscometer and a No. 2 spring with a Fann Yield Stress Adapter were used to measure the volumetric average viscosity in accordance with the procedure set forth in API RP Practice 10B-2, *Recommended Practice for Testing Well Cements*. The results of this test are shown in Table 4 below.

TABLE 4

Volume Average Viscosity of the Samples

| | Slurry Age (Days) | | | | | | | |
|---|---|---|---|---|---|---|---|---|
| | 0 | 1 | 5 | 12 | 16 | 19 | 21 | |
| Sample 1 | 1235 | 1235 | 1417 | 1508 | 1521 | 1538 | 1560 | VAV @ |
| Sample 2 | 1417 | 1560 | 2015 | 2457 | 2743 | 949 | 1313 | 100 rpm |
| Sample 3 | 1749 | | not measurable | | | | | |

Liquiment® 5581F dispersant was added to Sample 2 on day 19 in an amount of 0.1% by weight of the pumice. Example 2 indicates that the inclusion of a secondary retarder such as a lignosulfonate retarder may be used to counteract the effects of Portland cement in set-delayed cement compositions.

Example 3

The same set-delayed cement composition of Sample 2 in Example 2 was scaled up from 3 liters to 15 gallons and also to 35 barrels. The volumetric average viscosity for each sample size was plotted at 100 rpm over a 21 day span. The results of this test are listed in Table 5 below.

TABLE 5

Viscosity Tests

| Slurry Age (Days) | VAV @ 100 rpm |
|---|---|
| *1 Liter* | |
| 0 | 1417 |
| 1 | 1560 |
| 5 | 2015 |
| 12 | 2457 |
| 16 | 2743 |
| 19 | 949 |
| 21 | 1313 |
| *15 Gallon* | |
| 0 | 559 |
| 1 | 897 |
| 4 | 1131 |
| 5 | 1313 |
| 6 | 1254.5 |
| 7 | 1202.5 |
| 8 | 1625 |
| 10 | 2860 |
| 10 | 377 |
| 12 | 988 |
| 15 | 1118 |
| 23 | 897 |
| 27 | 1391 |
| 27 | 598 |
| 32 | 1703 |
| *35 bbl* | |
| 0 | 975 |
| 1 | 1508 |
| 2 | 1560 |
| 3 | 1566.5 |
| 4 | 1677 |
| 5 | 1859 |
| 6 | 1703 |
| 7 | 1950 |
| 8 | 2210 |
| 9 | 1976 |
| 10 | 2769 |
| 11 | 2795 |
| 11 | 1521 |
| 12 | 1898 |
| 13 | 2028 |
| 14 | 2314 |

TABLE 5-continued

Viscosity Tests

| Slurry Age (Days) | VAV @ 100 rpm |
|---|---|
| 15 | 2444 |
| 15 | 1001 |
| 16 | 1456 |
| 17 | 1989 |
| 18 | 2509 |
| 18 | 1066 |
| 19 | 1950 |
| 20 | 1989 |
| 21 | 3796 |
| 22 | 2470 |

Example 3 thus indicates that the inclusion of a secondary retarder such as a lignosulfonate retarder may be used to counteract the effects of Portland cement in set-delayed cement compositions on a larger scale.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the embodiments are well adapted to attain the ends and advantages mentioned as well as those that are inherent therein. The particular embodiments disclosed above are illustrative only, and they may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of cementing comprising:
providing a set-delayed cement composition comprising water, pumice, hydrated lime, a primary set retarder, a cement contaminant comprising Portland cement present in an amount less than about 5% by weight of the cement composition, and a secondary set retarder, wherein the secondary set retarder is present in an amount sufficient to suppress cementitious reactions caused by the cement contaminant such that the set-delayed cement composition remains in a pumpable fluid state for a time period of about 1 day or longer, and wherein the cement contaminant is unintentionally added to the set-delayed cement composition during blending, transport, or a combination thereof,
storing the set-delayed cement composition in a pumpable fluid state for a time period of about 1 day or longer, the storing happening at a surface prior to introduction into a subterranean formation;
thereafter, performing the following steps:
activating the set-delayed cement composition to produce an activated cement composition, wherein an activator is selected from the group consisting of amines, silicates, zinc formate, calcium acetate, groups IA and IIA hydroxides, polyphosphates, and combinations thereof;
introducing the activated cement composition into the subterranean formation; and
allowing the activated cement composition to set in the subterranean formation.

2. The method of claim 1 wherein the primary set retarder and the secondary set retarder are each selected from the group consisting of a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any combination thereof.

3. The method of claim 1 wherein the set-delayed cement composition further comprises a dispersant.

4. The method of claim 3 wherein the dispersant comprises at least one dispersant selected from the group consisting of a sulfonated-formaldehyde-based dispersant, a polycarboxylated ether dispersant, and any combination thereof.

5. The method of claim 1 wherein the primary set retarder comprises a phosphonic acid derivative, wherein the secondary set retarder comprises a lignosulfonate retarder, and wherein the set-delayed cement composition further comprises a polycarboxylated ether dispersant.

6. The method of claim 1 wherein the primary set retarder and the secondary set retarder are individually present in the set-delayed cement composition in an amount in the range of about 0.01% to about 10% by weight of the pumice.

7. The method of claim 1 wherein the cement contaminant further comprises at least one contaminant selected from the group consisting of a hydraulic cement other than Portland cement, a pozzolanic material, slag, cement kiln dust, gypsum plasters, lime plasters, cement plasters, and any combination thereof.

8. The method of claim 1 wherein the activated cement composition is used in a primary-cementing method.

9. The method of claim 1 wherein the activated cement composition is allowed to harden and form a cement sheath in a well-bore annulus between a conduit in the subterranean formation and a well-bore wall or between the conduit and a larger conduit in the subterranean formation.

10. The method of claim 1 wherein the set-delayed cement composition remains in a pumpable fluid state for a time period of at least about 7 days prior to the step of activating the set-delayed cement composition.

11. The method of claim 1 further comprising pumping the activated cement composition through a feed pipe and into a wellbore that is penetrating the subterranean formation.

12. A method of mitigating contamination in the manufacture of a set-delayed cement composition, the method comprising:
providing a dry-blend cement composition comprising pumice and hydrated lime; and
preparing a set-delayed cement composition comprising water, the dry-blend cement composition, a primary set retarder, and a secondary set retarder, wherein the set-delayed cement is contaminated with about 5% or less by weight of a cementitious contaminant comprising Portland cement during step of preparing and the secondary set retarder is present in an amount sufficient to suppress cementitious reactions caused by the Portland cement contaminant such that the set-delayed cement composition remains in a pumpable fluid state for a time period of about 1 day or longer; and
storing the set-delayed cement composition in a pumpable fluid state for a time period of about 1 day or longer, the storing happening at a surface prior to activation or introduction into a subterranean formation; and
activating the set-delayed cement composition to produce an activated cement composition, wherein an activator is selected from the group consisting of amines, silicates, zinc formate, calcium acetate, groups IA and IIA hydroxides, polyphosphates, and combinations thereof.

13. The method of claim 12 further comprising activating the set-delayed cement composition to produce an activated cement composition and introducing the activated cement composition into a subterranean formation.

14. The method of claim 12 further comprising storing the set-delayed cement composition for a period of about 7 days or longer.

15. The method of claim 12 wherein the primary set retarder and the secondary set retarder are individually selected from the group consisting of a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any combination thereof.

16. The method of claim 12 wherein the set-delayed cement composition further comprises a dispersant.

17. The method of claim 16 wherein the dispersant comprises at least one dispersant selected from the group consisting of a sulfonated-formaldehyde-based dispersant, a polycarboxylated ether dispersant, and any combination thereof.

18. The method of claim 12 wherein the primary set retarder comprises a phosphonic acid derivative, wherein the secondary set retarder comprises a lignosulfonate retarder, and wherein the set-delayed cement composition further comprises a polycarboxylated ether dispersant.

19. The method of claim 12 wherein the cementitious contaminant is present in an amount of about 5% by weight of the pumice or less, and wherein the cementitious contaminant further comprises at least one contaminant selected from the group consisting of a hydraulic cement other than Portland cement, a pozzolanic material, slag, cement kiln dust, gypsum plasters, lime plasters, cement plasters, and any combination thereof.

20. The method of claim 19 wherein the contaminant is unintentionally added to the set-delayed cement composition during blending, transport, or a combination thereof.

21. A set-delayed cement system comprising:
a set-delayed cement composition comprising water, pumice, hydrated lime, a primary set retarder, a cementitious contaminant and a secondary set retarder, wherein the secondary set retarder is operable to suppress cementitious reactions caused by the cementitious contaminant such that the set-delayed cement composition is capable of remaining in a pumpable fluid state for about one day or longer;
an activator for activating the set-delayed cement composition wherein the activator is selected from the group consisting of amines, silicates, zinc formate, calcium acetate, groups IA and IIA hydroxides, polyphosphates, and combinations thereof;
storage equipment configured to store the set-delayed cement composition at a surface in a pumpable fluid state for at least about one day or longer;
mixing equipment for mixing the set-delayed cement composition and the activator to form an activated cement composition; and
pumping equipment for delivering the activated cement composition into a wellbore.

22. The system of claim 21 wherein the set-delayed cement composition further comprises a dispersant.

23. The system of claim 21 wherein the primary set retarder comprises a phosphonic acid derivative, wherein the secondary set retarder comprises a lignosulfonate retarder, and wherein the set-delayed cement composition further comprises a polycarboxylated ether dispersant.

24. A method of cementing comprising:
preparing a set-delayed cement composition comprising water, pumice, hydrated lime, a primary set retarder, and a secondary set retarder, wherein a cementitious component is unintentionally included the set-delayed cement composition during the preparing;
storing the set-delayed cement composition in a pumpable fluid state for a time period of about 1 day or longer at a surface,
thereafter, activating the set-delayed cement composition to produce an activated cement composition wherein an activator is selected from the group consisting of amines, silicates, zinc formate, calcium acetate, groups IA and IIA hydroxides, polyphosphates, and combinations thereof;
introducing the activated cement composition into a subterranean formation; and
allowing the activated cement composition to set in the subterranean formation.

25. The method of claim 24 wherein the set-delayed cement composition further comprises a dispersant.

26. The method of claim 24 wherein the primary set retarder comprises a phosphonic acid derivative, wherein the secondary set retarder comprises a lignosulfonate retarder, and wherein the set-delayed cement composition further comprises a polycarboxylated ether dispersant.

* * * * *